H. R. DAM.
RECHARGEABLE ELECTRIC BATTERY.
APPLICATION FILED DEC. 12, 1918.
1,377,060.
Patented May 3, 1921.
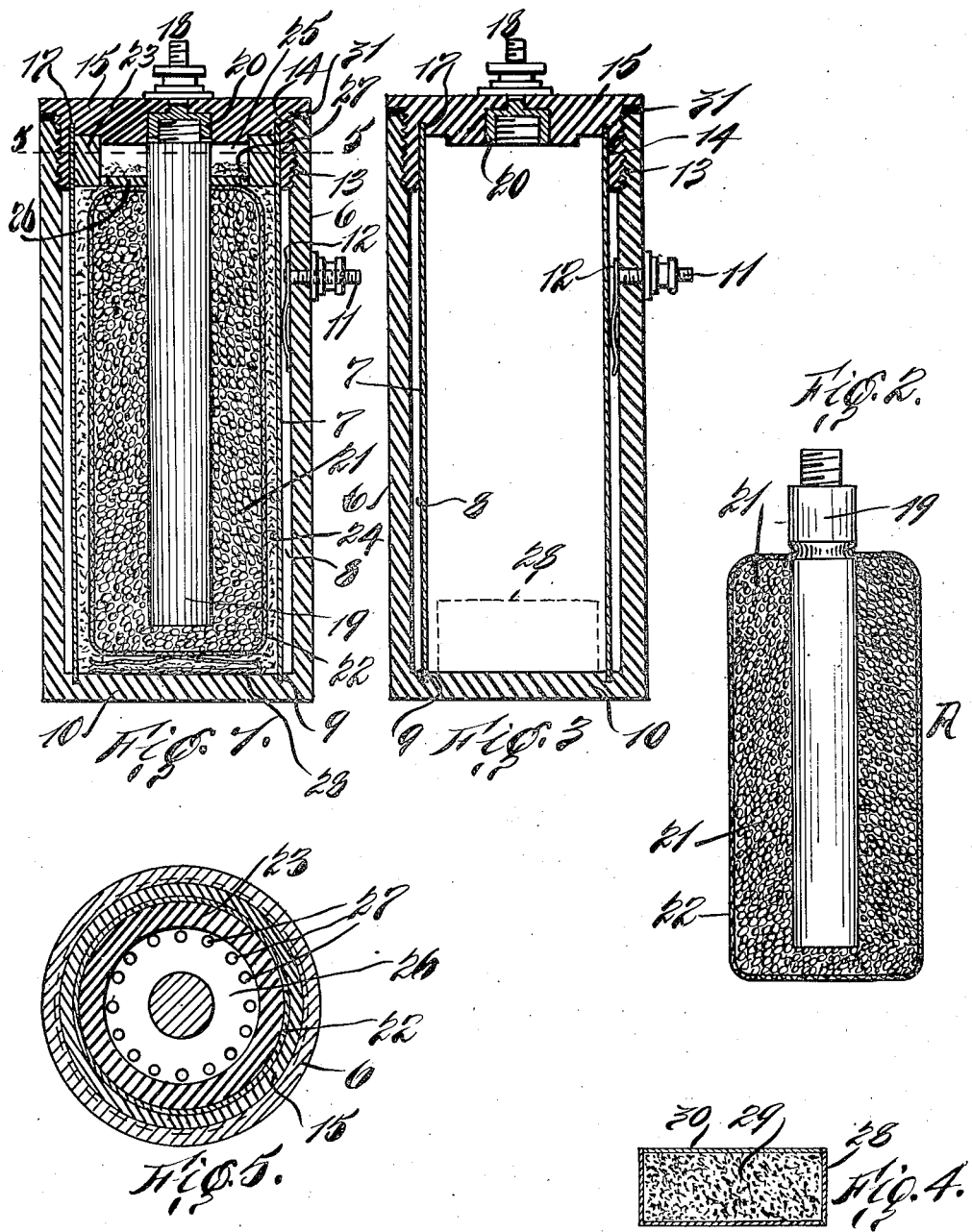
INVENTOR
Henry Rosendal Dam
BY
ATTORNEY

UNITED STATES PATENT OFFICE.

HENRY ROSENDAL DAM, OF BROOKLYN, NEW YORK, ASSIGNOR OF ONE-HALF TO JOSEPH BLOCK, OF BROOKLYN, NEW YORK.

RECHARGEABLE ELECTRIC BATTERY.

1,377,060.  Specification of Letters Patent.  Patented May 3, 1921.

Application filed December 12, 1918. Serial No. 266,422.

*To all whom it may concern:*

Be it known that I, HENRY ROSENDAL DAM, subject of the King of Denmark, residing at Brooklyn, Kings county, State of New York, have invented certain new and useful Improvements in Rechargeable Electric Batteries, of which the following is a full, clear, and exact description.

This invention relates to improvements in dry batteries and has for an object to provide a dry battery that can be recharged, and which will also act as a reserve cell or a cell that will be inactive as a current generating element until same is to be used. It is well known that dry batteries will deteriorate when not in use, as for example when stored away for sale in the future, and it ofttimes occurs that dry batteries are found to be lifeless after having stood for some length of time, due to constant chemical action of the elements thereof especially when exposed to dampness or climatic changes. One of the objects of my invention is to obviate this tendency and also to provide a dry battery that can be recharged.

I will now proceed to describe the manner by which I obtain the above mentioned objects, reference being had to the accompanying drawing forming part hereof, wherein:—

Figure 1 is a vertical sectional view of my improved battery, assembled;

Fig. 2 is a similar view of one of the component parts thereof;

Fig. 3 is also a similar view of the outer casing and the zinc shell and cap carried thereby;

Fig. 4 is a vertical sectional view of the electrolytic container which forms part of my invention;

Fig. 5 is a sectional plan view, the section being taken on a line 5—5 in Fig. 1;

To carry my invention into practice I provide a dry battery consisting of elements which do not become active until assembled for use; that is to say, the elements of which the battery is composed will be separated or kept apart, until the battery is to be placed in use.

Referring now to the accompanying drawing in which one form of my invention has been illustrated, I provide a battery casing 6 composed of some non-conducting material such as wood, hard rubber or the like, within which is placed a zinc cylinder or shell 7 which is preferably spaced from the wall of the casing to provide an air space or jacket 8. The shell 7 is held in a cylindrical groove 9 in the bottom 10 of the casing. The zinc shell is open at both ends, and the bottom 10 of the casing 6 therefore forms the bottom of the battery. The casing 6 is further provided with a binding-post 11 connected at its inner end to a metal conductor 12 which bears against the shell 7. The open end of the casing 6 is threaded as at 13 to engage the threads 14 of a screw cap 15. The cap 15 may be composed of any suitable non-conducting material and is provided with a cylindrical groove 17 to receive the upper end of the zinc shell 8 when said cap is screwed into the casing 6 as shown in Fig. 1.

The screw cap 15 is further provided with a binding-post 18 which engages the carbon pencil 19 and supports same. The upper end of the carbon pencil 19 is inserted in the cap portion 20 of said binding-post and held in any desired manner, in the present instance by screw threads. The other active agents of the battery beside the zinc shell 8, include the carbon pencil 19 with the depolarizing agent 21, packed thereabout, and the paste electrolyte 29.

Thus the battery may be said to consist of three complementary units, the anode unit, the cathode unit, and the activating unit. The first unit comprises the casing 6, which contains the zinc shell 7; the second comprises the screw cap 15 the carbon pencil 19 and the depolarizing agent 21. The latter unit is provided with a bag, sack or wrapping, indicated by 22 for the depolarizing agent which is preferably granular. The carbon pencil is embedded in the depolarizing agent 21 which is maintained in mass formation around the pencil by said sack or wrapping 22, which is preferably of cloth or other porous material. A further element of this unit is the centralizing element or disk 23 of non-conducting material such as fiber, which acts to position the carbon cathode unit centrally within zinc shell 7 of the anode unit.

As can be seen in Fig. 1 the diameter of the sack 22 is somewhat less than the inner diameter of the shell 7 to provide a space 24 for the electrolyte. It will also be seen in Fig. 1 that the disk 23 fits the interior of the shell 7 and is larger in diameter than the sack 22. Moreover said disk is located between the top of the sack 22 and cap 15 and surrounds the carbon pencil 19. The disk 23 is counterbored to provide a pocket 25 having its bottom 26 perforated as at 27 (see also Fig. 5) for a purpose to be hereafter described. The upper surface of the centralizing disk 23 is in contact with the screw cap 15, while the bottom of said disk contacts with the upper end of the sack 22. The cathode unit or bobbin, indicated generally by A, is secured in position by engaging the threads of the screw cap 15 in the threads of the casing 6 and rotating the screw cap until it reaches the limit of its downward movement. The sack 22 will then be located centrally of the shell 7 thereby providing a uniform electrolyte space between the electrodes. When assembled as above described, the battery is incomplete and inactive. To render the units active, it is necessary to introduce an electrolyte into the space 24 and moisten the depolarizing agent.

The battery when assembled in inactive condition, as above described, may be packed away until needed, without any fear of deterioration of the electrodes, because the activating agent or electrolyte which renders the electrodes active is absent. If desirable, the units may be packed away separately within the spirit of this invention, as the broad invention is not to be limited to any particular shipping or storing arrangement of the parts of the battery.

To render the battery elements active it is merely necessary to dampen the depolarizing agent and fill the space 24 with the electrolyte. The introduction of the electrolyte forms an important part of my invention. The third unit of the battery consists of a frangible retainer 28 preferably gelatinous material within which the electrolyte, indicated by 29, in paste form is placed. The electrolyte should preferably be about the consistency of vaseline and the container should be designed to hold enough of the electrolyte to completely fill the space 24 between the sack 22 and shell 7. After the electrolyte is placed in the container, a cap or top 30 will be placed over the open end of the container and hermetically sealed to exclude air and moisture from the interior of the container.

To prepare the inactive battery for use the cathode or bobbin unit A is first removed and the container 28 is then placed on the bottom 10 of the casing within the shell 7. The sack 22 is then placed in water for a few minutes to dampen the depolarizing agent 21. After this operation has been performed the unit A is replaced within the casing 6, and screwed down by manipulating the cap 15. The screwing down of the cap will force the sack against the container 28. A continuation of this operation will so flatten the container that it will burst (it being designed to burst under pressure) and the electrolyte will be forced therefrom into the space 24. Should the electrolyte more than fill the space 24, the excess will be forced to flow through the perforations 27 in the bottom 26 of the centralizing element 23 into the pocket 25.

The battery is now fully activated and ready for instant use.

To render the joint between the screw cap 15 and casing 6 absolutely tight, I provide a gasket 31 of rubber or the like. The provision of the air space 8 between the zinc shell and casing 6 protects the said shell from dampness, climatic changes, or atmospheric influences, which might tend to injure it and decrease its life.

One of the great advantages of my improved arrangement is that a battery, made in accordance with my improvement, can be readily recharged. To recharge the battery, it is merely necessary to take the elements apart, wash the zinc shell thoroughly and remove all deleterious salts, after which a new container, charged with fresh or unused electrolyte, can be introduced.

By keeping a supply of electrolyte cartridges or containers on hand, a cell can be recharged repeatedly. Furthermore, I believe I am the first to produce a dry battery that can be taken apart, cleaned and reassembled, and also one that does not contain an active agent when not in use.

As will be evident, I have produced an improved form of dry cell, the elements of which may be kept separate and inactive until it is desired to put it into use, and which may then be readily assembled instantly to form a complete and fully active cell. Hence no portion of the normal life of the cell can be wasted while the parts are held in storage preparatory to use, and by permitting the recharging of depleted cells, the same electrodes may be repeatedly used till consumed. Thus, I secure the maximum economy in the use of the elements of a dry cell, thereby enhancing the value of the cell and greatly increasing the length of its useful life.

Having now described my invention what I claim is:—

1. In a dry cell of the type described, a tubular anode, a cathode located within said tubular anode and spaced therefrom, a casing surrounding said tubular anode and spaced therefrom to provide an air-jacket around said anode, and an electrolyte occupying the space between the tubular anode and the cathode.

2. In a dry cell of the type described, an anode, a cathode and an electrolyte for activating said electrodes, said anode comprising a tubular zinc shell open at both ends and carried by an outer casing, said casing and said zinc shell being spaced from one another to provide an air-jacket around said shell.

3. In a dry cell adapted to remain inactive until it is desired to put the cell into use, a casing open at the top, a cap detachably fitting the open top of the casing, a tubular anode detachably supported upon the bottom of said casing and spaced from the sides thereof, a cathode detachably carried by said cap within said tubular anode, and a paste electrolyte for said cell, adapted to be forced into active position by relative movement of said anode and cathode.

4. In a dry cell having a paste electrolyte, a cathode unit, an anode unit, said anode unit comprising a cup-shaped casing of non-conducting material having a circular groove in the bottom thereof and spaced from its inner circumference, and a tubular zinc shell having its lower end supported in said groove.

5. An anode unit for a dry cell comprising a cup of non-conducting material, and a zinc shell cylindrically supported on the bottom of said cup, said shell being spaced from the side walls of the cup leaving a substantial air space therebetween.

6. In a dry cell of the type described, a cylindrical anode element, a cathode element located therewithin, means to centralize the cathode element within said anode, said centralizing means being carried at the upper end of said electrodes and comprising an annular disk having a series of perforations therein.

7. In a dry cell of the type adapted to remain inactive until it is desired to put the cell into use, a cathode unit an anode unit including a container, and an activating unit initially maintained separate from said cathode and anode units, said activating unit comprising a frangible air tight, cylindrical container carrying a supply of activating paste.

8. In a dry cell of the type described, an anode, a cathode and an auxiliary frangible receptacle containing paste for activating said cell, an outer container for said electrodes and paste, a detachable cover for said container, said anode and cathode being detachably supported within said container and cap, said frangible receptacle being initially located outside of said container whereby said cell will remain wholly inactive until it is desired to put it into use, and may be replenished after it has become depleted by use.

9. In a dry cell adapted to remain inactive until it is desired to put the cell into use, a cup-shaped casing of insulating material having a centralizing circular groove on the bottom thereof, a cap detachably fitted in the top of said casing and having a circular groove in alinement with the groove in the bottom of the casing, a cathode, a cylindrical zinc tubular anode open at both ends fitting within said grooves, and means for activating the cell.

10. In a dry cell of the type described an outer casing of non-conducting material, said casing carrying a detachable zinc tubular anode therewithin, and being provided with a detachable cover, said cover carrying a detachable cathode, and means for activating the cell initially detached from the other elements of said cell.

Signed at New York city, N. Y., this 3rd day of December, 1918.

HENRY ROSENDAL DAM.

Witnesses:
EDWARD A. JARVIS,
BERTHA HOLEN.